(12) United States Patent
Giraud et al.

(10) Patent No.: US 10,399,752 B2
(45) Date of Patent: Sep. 3, 2019

(54) FLUID RECEIVER FITTING FOR ASEPTIC FLUID TRANSFER AND METHODS FOR MAKING THE SAME

(71) Applicant: CSP TECHNOLOGIES, INC., Auburn, AL (US)

(72) Inventors: Jean-Pierre Giraud, Auburn, AL (US); Herve Pichot, Chennevierees-sur-Marne (FR); Franklin Lee Lucas, Jr., Opelika, AL (US); Ethan Ross Perdue, Auburn, AL (US)

(73) Assignee: CSP TECHNOLOGIES, INC., Auburn, AL (US)

( * ) Notice: Subject to any disclaimer, the term of this patent is extended or adjusted under 35 U.S.C. 154(b) by 0 days.

(21) Appl. No.: 15/575,953

(22) PCT Filed: May 20, 2016

(86) PCT No.: PCT/US2016/033561
§ 371 (c)(1),
(2) Date: Nov. 21, 2017

(87) PCT Pub. No.: WO2016/187557
PCT Pub. Date: Nov. 24, 2016

(65) Prior Publication Data
US 2018/0155095 A1 Jun. 7, 2018

Related U.S. Application Data

(60) Provisional application No. 62/165,104, filed on May 21, 2015.

(51) Int. Cl.
*B65D 51/00* (2006.01)
*A61J 1/14* (2006.01)
(Continued)

(52) U.S. Cl.
CPC .......... *B65D 51/002* (2013.01); *A61J 1/1406* (2013.01); *B29C 45/006* (2013.01);
(Continued)

(58) Field of Classification Search
CPC .................................................... B65D 51/002
(Continued)

(56) References Cited

U.S. PATENT DOCUMENTS 3,460,702 A   8/1969   Andrews
3,707,239 A   12/1972  Harris et al.
(Continued)

*Primary Examiner* — Anthony D Stashick
*Assistant Examiner* — Raven Collins
(74) *Attorney, Agent, or Firm* — Mark T. Vogelbacker; Eckert Seamans Cherin & Mellott, LLC

(57) ABSTRACT

A fluid receiver fitting (FRF) for supporting aseptic fluid transfer between enclosures, as well as methods for forming the fluid receiver, is disclosed. The FRF includes a unitized seal section (226) and channel section (228) formed together by 2-shot injection molding, thereby eliminating or minimizing modes of fluid contamination where the seal section and channel section are separate members. The channel section may comprise one or more channels (286) for insertion of a needle (N) therein and a respective penetration zone (266) in a corresponding section of the seal section for the needle to penetrate and thereby extract a fluid sample from a liquid stream against which a portion of the seal section is exposed. An angled interface (288) between each channel and its corresponding penetration zone provides a liquid stream pressure concentration zone which applies pressure to close a core (C) in the seal section formed by removal of the needle.

27 Claims, 12 Drawing Sheets

(51) Int. Cl.
  *B29C 45/00* (2006.01)
  *B29C 45/02* (2006.01)
  *B67D 7/02* (2010.01)
  *B29K 623/00* (2006.01)

(52) U.S. Cl.
  CPC .......... *B29C 45/0053* (2013.01); *B29C 45/02* (2013.01); *B67D 7/0288* (2013.01); *B29C 2045/0079* (2013.01); *B29K 2623/12* (2013.01)

(58) Field of Classification Search
  USPC ................................................ 215/247, 364
  See application file for complete search history.

(56) References Cited

U.S. PATENT DOCUMENTS

| | | | | |
|---|---|---|---|---|
| 3,779,082 | A | * | 12/1973 | Galloway ................ G01N 1/14 141/29 |
| 4,423,641 | A | | 1/1984 | Ottung |
| 4,445,896 | A | | 5/1984 | Gianturco |
| 4,941,517 | A | * | 7/1990 | Galloway ................. B67B 7/26 141/1 |
| 2007/0066941 | A1 | * | 3/2007 | Tezuka .................. A61J 1/1406 604/167.01 |
| 2012/0009410 | A1 | | 1/2012 | Giraud et al. |

* cited by examiner

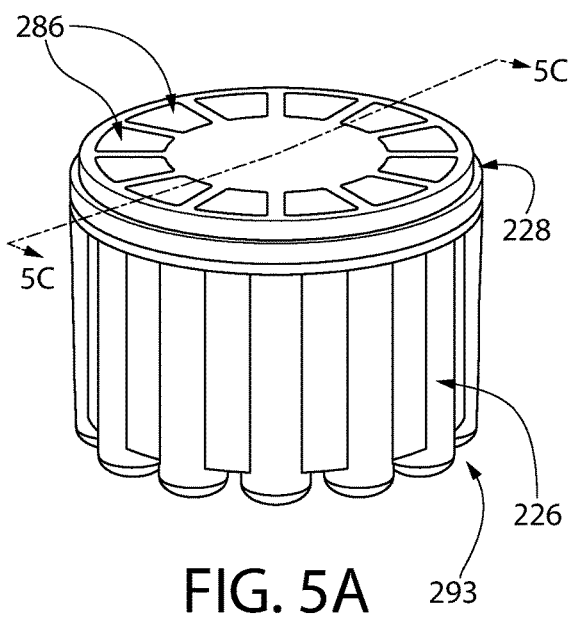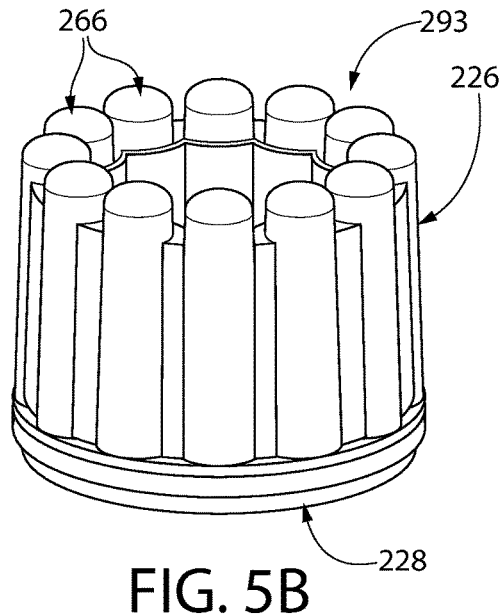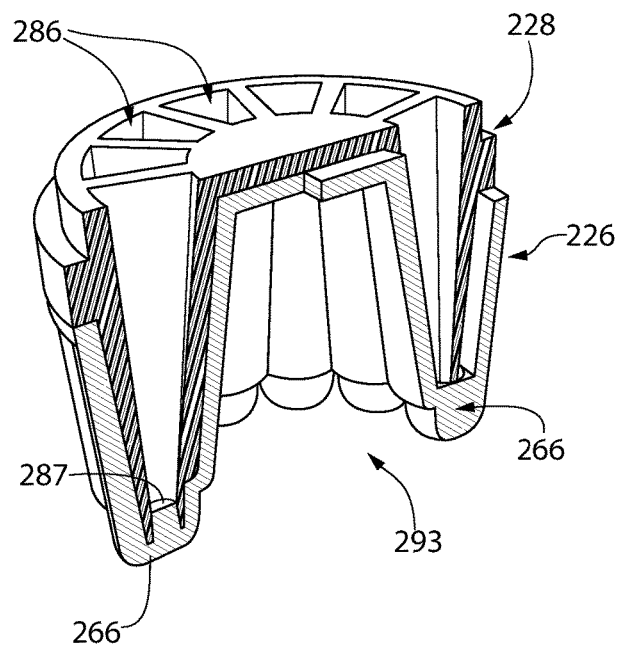
FIG. 5A
FIG. 5B
FIG. 5C

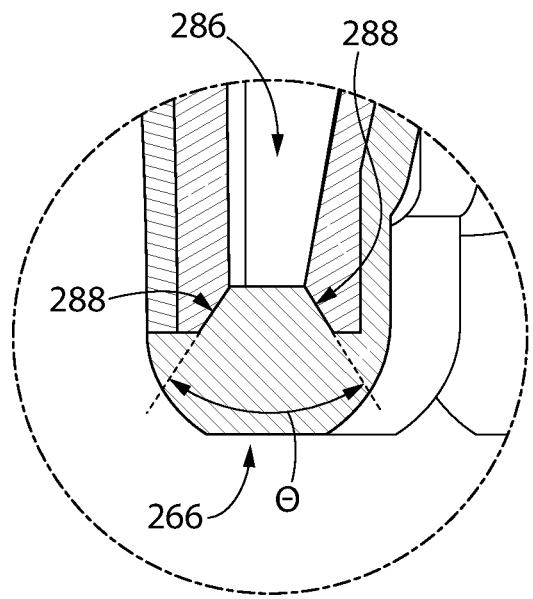
FIG. 5I
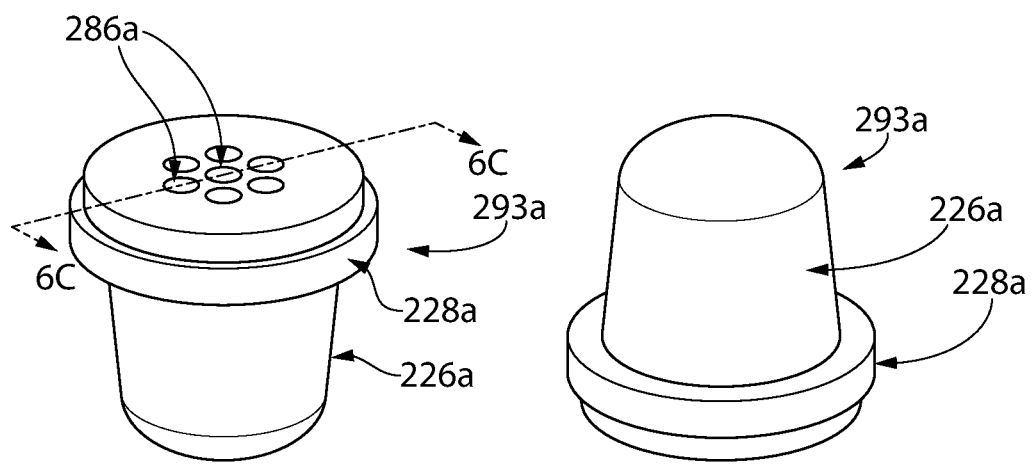
FIG. 6A
FIG. 6B

FLUID RECEIVER FITTING FOR ASEPTIC FLUID TRANSFER AND METHODS FOR MAKING THE SAME

CROSS-REFERENCE TO RELATED APPLICATIONS

This application is a U.S. National Phase of International Application No. PCT/US2016/033561 filed May 20, 2016, which claims priority to U.S. Provisional Patent Application No. 62/165,104 filed on May 21, 2015 entitled SEPTA FOR ASEPTIC FLUID TRANSFER AND METHODS FOR MAKING THE SAME and whose entire disclosure is incorporated by reference herein.

FIELD OF INVENTION

The invention relates generally to septa and specifically fluid receiver fittings for aseptic fluid transfer. The invention further relates to methods for molding fluid receiver fittings, e.g., through multi-shot injection molding processes.

BACKGROUND

For certain applications, the transfer of fluids from one enclosure to another must be done in such a way as to prevent contamination of the fluid being transferred. For example, in the pharmaceutical, biotech, diagnostic and dairy industries, fluids (e.g., samples) are routinely transferred from a dispensing enclosure to a receiving enclosure, without introducing contaminating material into the receiving enclosure.

The word "enclosure" as used herein refers to any closed containment structure without respect to its size. Thus it includes such small enclosures as cans which may be used in shipping starter bacteria from a culture lab. On the other end of the size spectrum, it includes large tanks, which may have capacities of several thousand gallons, or more, such as are used in the dairy processing industry.

The apparatus for aseptic transfer of material between enclosures described in U.S. Pat. No. 4,941,517 (the '517 patent), which is incorporated by reference herein in its entirety, provided a helpful means for the aseptic transfer of fluids. The apparatus includes a fluid receiver assembly comprising an adapter and a fluid receiver fitting mounted therein. The fluid receiver fitting comprises a seal member, channel member and covering film. The fitting includes a plurality of needle guide channels leading from the outside of the fluid receiver assembly toward the interior of the enclosure and a seal at the ends of the channels. A pierceable self-closing seal is provided between ends of each of the channels and the interior of the enclosure.

For purposes of providing background relating to the present invention, the fluid receiver assembly of the '517 patent is now discussed with reference to drawing figures provided in that application. The drawing figures are renumbered in this specification from the drawing figure numbers provided in the '517 patent.

FIGS. 1, 2, 3 and 4 of the present specification respectively correspond to FIGS. 11, 6, 8 and 10 of the '517 patent. FIG. 1 shows a cross-section of the overall fluid receiver assembly (FRA) 12 installed on a wall 16 of an enclosure, while FIG. 2 depicts a cross-section of a seal member 26 portion of the FRA 12; FIG. 3 depicts a cross-section of a channel member 28 portion of the FRA 12 and FIG. 4 is a cross-sectional view of a fluid receiver fitting 93 portion of the FRA 12 formed by the combination of the seal member 26 and channel member 28.

In particular, as shown in FIG. 1, the fluid receiver assembly 12 includes an adapter 24, the seal member 26, the channel member 28, a retaining ring 30, and a cover film 31. The FRA 12 is incorporated into a wall of an enclosure such as wall 16 of a tank (not shown) by means of weld 34.

Seal member 26 has generally opposing first and second surfaces 58 and 60 respectively. The first surface 58 has a first generally outwardly projecting central portion 62 which is shown convex, and an upstanding outer wall portion 64 generally corresponding to an outer wall of adapter 24. Penetration zone 66 is between wall portion 64 and central portion 62. Penetration zone 66 is generally coextensive with the circumference of the first surface at its lower terminus between upstanding wall portion 64 and central portion 62.

Second surface 60 has a plurality of bottom portions 68 (also referred as seal elements), an upstanding wall portion 70, and a surface central portion 72. Each of the seal elements forms a projection extending downwardly from the seal means. The projections, in combination, define an array thereof. Interrupting surface wall portions 74 extend upwardly from, and between adjacent bottom portions 68, and interface with bridging walls 52 in adapter 24. Bottom portions 68 are aligned with penetration zone 66. Upstanding wall portions 64 and 70 together generally define a wall 71 between them.

The penetration zone 66 includes a main surface 66M comprising the majority of the surface area of the penetration zone. Recesses 67 extend from the main surface 66M toward bottom portions 68. One bottom portion 68 fits into each of the holes of adapter 24. Seal member 26 is preferably made from rubber, e.g., based on ethylene propylenediene monomer terpolymer (EPDM), or other elastomers, e.g., those derived from, or modified with, butene, isoprene, ethylene, and the like.

Channel member 28 is seen to have generally opposing first bottom and second top surfaces 76 and 78 respectively. First bottom surface 76 has a first bottom portion 80, including optional projections 81, a second upstanding wall portion 82, and a third central portion 84. A plurality of tapered needle guide channels 86 extend between the first and second surfaces and are encompassed, on their lower ends, adjacent bottom surface 76, with projections 81, which include the lower ends of channels 86. Channels 86 are preferably countersunk at their lower, narrower ends as seen at 87. The axes 88 of the channels diverge from each other, traversing from top 78 to bottom 76. The axes 88 also diverge from central axis 90 of the channel member, when traversing from the top of the channel member as at 78 toward the bottom. In each of needle channels 86, that surface 94 which most closely approaches the central axis 90 also diverges, top to bottom, from central axis 90 along the channel length. Thus is the downward divergence of the channels 86 established with respect to the central axis, with respect to each other, and with respect to the central axis as related to those surfaces 94 of the channels which most closely approach the central axis.

Channel member 28 is made of a material that is normally not penetrable by conventional hypodermic needles, e.g., one of the engineering plastics, such as nylon, polypropylene, or high density polyethylene. The penetrability of channel member 28 is thus provided by the pre-formed needle channels 86, which extend through the channel member from top 78 to bottom 76.

Fluid receiver fitting 93 is seen in FIG. 4. It comprises the seal member 26, the channel member 28, and the covering film 31, and has a first outer surface corresponding to the second surface 60 as shown in FIG. 1. The first inner surface of the receiver fitting 93 corresponds to the first surface 58 of seal member 26. The second inner surface of the fitting corresponds to surface 76 of channel member 28. The second outer surface of fitting 93 corresponds in general to surface 78 of channel member 28. In keeping with the relatively small thickness of covering film 31, the second outer surface of the fitting generally includes the entire thickness of film 31. Thus film 31 covers the ends of needle channels 86 of channel member 28. Cover film 31 which covers the outer surfaces of needle channels 86 at the points they intersect the surface 78 of channel member 28 may be made from any of a plurality of readily pierceable film materials.

The second inner surface of fitting 93 includes a first surface portion corresponding to the bottom portion 80, including projections 81, which is in contact with penetration zone 66 of seal member 26, preferably over all of the contiguous surfaces of bottom portion 80 and penetration zone 66. Projections 81, which comprise extensions of needle channels 86, are aligned with, and fit into, recesses 67 in seal member 26.

The central surface portion 84 of the second inner surface is optionally concave, whereby it cooperatively receives the central portion 62 of the first inner surface of seal member 26, which is optionally convex. Thus, central surface portion 84 cooperates in receiving the strengthening and stabilizing central core member 38 of adapter 24. As seen in FIG. 4, surfaces 62 and 84 preferably share a common interface about their contiguous surfaces.

The apparatus is useful for aseptically transferring material into an enclosure such as a tank. The adapter 24 is preferably permanently installed in a wall or other outer member of an enclosure such as a tank, e.g., as shown in FIG. 1. After the adapter 24 has been installed, a receiver fitting 93 is installed in adapter 24.

Fitting 93 is installed in adapter 24, to make fluid receiver assembly 12, by bringing surface 60 of seal member 26 into surface contact with the surfaces about channel 46, namely, inserting fitting 93 into adapter 24, with seal member 26 facing the adapter. The adapter, the seal member, and the channel member are jointly configured and adapted to assure the alignment of channels 86 with holes in adapter, with an intervening pierceable, self-closing portion of the seal member corresponding to penetration zone 66. This alignment assures an unimpeded passage of needles through the fitting 93 along paths prescribed for the needles. With the fitting thus aligned in the adapter, retaining ring 30 is emplaced and secured, whereby the installation of fitting 93 into tank (not shown) is completed. As retaining ring 30 is tightened, it seats against flange 92 of channel member 28, whereby seal member 26 is compressed between adapter 24 and channel member 28. As seal member 26 is compressed, bottom portions 68 are urged into holes of adapter. As the compression progresses, additional rubber flows through the holes of adapter and extends the original contours of bottom portions 68 further beyond the interior surface 44 of the adapter, such that the combinations of the original bottom portions 68 plus the additional material appear as nipples 154 comprising a greater amount of the rubber material than only the bottom portions 68, on the inside surface of the tank, as seen in, for example, FIG. 1.

The fluid receiver assembly 12 is configured to receive one or a plurality of needles, wherein each needle connects in fluid communication with a delivering enclosure to provide the aseptic transfer of fluid from the dispensing enclosure to the receiving enclosure. To provide aseptic fluid communication between the two enclosures, each needle punctures the film 31, enters a respective channel 86, and penetrates the penetration zone 66 until emerging through the bottom portions 68 to the interior of the receiving disclosure.

Up until now, commercial manufacture of the fluid receiver fitting 93 described in the '517 patent and above has involved assembly of its separately manufactured components, namely the seal member 26, the channel member 28 and the covering film 31. As described in the '517 patent, the mating surfaces of the fluid receiver fitting's components are adhesively bonded to one another. See '517 patent at col. 15, line 53 to col. 16, line 2. This method of manufacturing the fluid receiver fitting is suboptimal. One problem is that manufacture of separate components for assembly requires tight tolerances that complicate the manufacturing process. The need to maintain tight tolerances is particularly important for the fluid receiver fitting, which is to be used for aseptic fluid transfer. In that application, improperly or even loosely assembled parts presents an unacceptable risk of contamination. Further, the adhesives that are used to bond the components carry residual solvents which themselves can be a source of contamination. This risk is unacceptable given the intended use of the fluid receiver fitting.

There is thus a need for a fluid receiver fitting and a process for making the same, which does not require assembly of separate components, does not employ the use of bonding adhesives or fasteners to complete the assembly, and provides for closing off a core or hole formed in a needle penetration zone of the seal member where the sampled fluid is a liquid stream.

SUMMARY OF THE INVENTION

A fluid receiver fitting for supporting the aseptic transfer of a fluid is disclosed. The fluid receiver fitting comprises: a seal section formed by injection molding a first material (e.g., thermoplastic elastomer (TPE), etc.) adapted to be pierceable by conventional hypodermic needles once the first material is set; a channel section formed by injection molding a second material (e.g., nylon, polypropylene (PP), polyethylene (PE—high density, low density, LLD, VLLD), polyvinyl chloride (PVC), high impact polystyrene (HIPS), cyclic olefin co-polymer (COC), cyclic olefin polymer (COP), polyethylene vinyl acetate (EVA), polystyrene (PS), polycarbonate (PC), polyester terephthalate (PET), acetal copolymer or homopolymer resin, and/or liquid crystal polymer, etc.) that is adapted to not be pierceable by conventional hypodermic needles once the second material is set; wherein the channel section comprises one or more channels therein, each of the channels comprising a first end that provides ingress into a respective channel and a second end that forms an interface with a portion of the seal section, wherein the seal section and the channel section are molded into a unitary element (e.g., a weld defined by the solidification of melted portions of said first material and said second material) such that the seal section surrounds the channel section except at the first ends of the channels, wherein the interfaces between each second end and a respective portion of the seal section form respective penetration zones to permit the passage of a hypodermic needle therethrough when the needle is passed through the respective channel to gain aseptic access to the fluid to be transferred when a portion of seal section, adjacent said penetration zones, is exposed to the fluid.

A method of forming fluid receiver fitting (FRF) for supporting the aseptic transfer of a fluid is disclosed. The method comprises: forming a channel section of the FRF by injecting a shot of first material (e.g., nylon, polypropylene (PP), polyethylene (PE—high density, low density, LLD, VLLD), polyvinyl chloride (PVC), high impact polystyrene (HIPS), cyclic olefin co-polymer (COC), cyclic olefin polymer (COP), polyethylene vinyl acetate (EVA), polystyrene (PS), polycarbonate (PC), polyester terephthalate (PET), acetal copolymer or homopolymer resin, and/or liquid crystal polymer, etc.) into a cavity of a mold that creates at least one channel in the channel section wherein the at least one channel has a first end and a second end, the first material not being penetratable by a hypodermic needle when the first material is cooled; optionally shuttling or rotating the mold; forming a seal section of the FRF by injecting a shot of second material (e.g., thermoplastic elastomer (TPE), etc.) into the cavity, the seal section closing off the second end and surrounding the channel section except at the first end, the second material being penetratable by a hypodermic needle when the second material is cooled; and adhering the channel section and the seal section by a weld defined by interface solidification of melted portions of the first material and the second material to form a unitary element.

A method of forming fluid receiver fitting (FRF) for supporting the aseptic transfer of a fluid is disclosed. The method comprises: forming a channel section of the FRF by injecting a shot of first material (e.g., nylon, polypropylene (PP), polyethylene (PE—high density, low density, LLD, VLLD), polyvinyl chloride (PVC), high impact polystyrene (HIPS), cyclic olefin co-polymer (COC), cyclic olefin polymer (COP), polyethylene vinyl acetate (EVA), polystyrene (PS), polycarbonate (PC), polyester terephthalate (PET), acetal copolymer or homopolymer resin, and/or liquid crystal polymer, etc.) into a first cavity of a mold that creates at least one channel in the channel section wherein the at least one channel has a first end and a second end, the first material not being penetratable by a hypodermic needle when the first material is cooled; forming a seal section of the FRF by injecting a shot of second material (e.g., thermoplastic elastomer (TPE), etc.) into a second cavity of the mold, the second material being penetratable by a hypodermic needle when the second material is cooled; forming a sealing cover for application over the first end; and adhering the channel section and the seal section by a weld defined by interface solidification of melted portions of the first material and the second material to form a unitary element, and wherein the seal section closes off the second end and surrounding the channel section except at the first end; and adhering the sealing cover over the first end by heat sealing.

A method of forming a fluid receiver fitting (FRF) for supporting the aseptic transfer of a fluid is disclosed. The method comprises: forming a channel section of said FRF by injecting a shot of first material (e.g., nylon, polypropylene (PP), polyethylene (PE—high density, low density, LLD, VLLD), polyvinyl chloride (PVC), high impact polystyrene (HIPS), cyclic olefin co-polymer (COC), cyclic olefin polymer (COP), polyethylene vinyl acetate (EVA), polystyrene (PS), polycarbonate (PC), polyester terephthalate (PET), acetal copolymer or homopolymer resin, and/or liquid crystal polymer, etc.) into a cavity of a first mold that creates at least one channel in the channel section wherein the at least one channel has a first end and a second end, the first material not being penetratable by a hypodermic needle when the first material is cooled; forming a seal section of the FRF by injecting a shot of second material (e.g., thermoplastic elastomer (TPE), etc.) into a cavity of a second mold, the second material being penetratable by a hypodermic needle when the second material is cooled; allowing the first material to cool and the second material to form a molded channel section and a molded seal section; inserting the molded channel section within the molded seal section; and adhering the molded channel section and the molded seal section by a weld defined by interface solidification of melted portions of the first material and the second material to form a unitary element, and wherein the seal section closes off the second end and surrounding the channel section except at the first end.

BRIEF DESCRIPTION OF THE DRAWINGS

The background of the invention and the invention itself will be described in conjunction with the following drawings in which like reference numerals designate like elements and wherein:

FIG. 5A is isometric view of a twelve-needle channel (i.e., port) fluid receiver fitting or septum, without a sealing cover, according to a first embodiment of the present invention;

FIG. 5B is inverted perspective view of the twelve-port fluid receiver fitting or septum, of the device of FIG. 5A;

FIG. 5C is an enlarged cross-sectional view of the twelve-port fluid receiver fitting or septum, without a sealing cover, taken along line 5C-5C of FIG. 5A;

FIG. 5I is an enlarged view of the angled interface of FIG. 5H;

FIG. 6A is isometric view of a seven-port fluid receiver fitting or septum, without a sealing cover, according to an alternative embodiment of the present invention;

FIG. 6B is inverted perspective view of the seven-port fluid receiver fitting or septum, of the device of FIG. 6A;

DETAILED DESCRIPTION OF THE PREFERRED EMBODIMENTS

Two-shot or multi-shot injection molding allows different materials having different functional properties to be molded into a single part without the need to use fasteners or adhesives to join the materials together. The two or more materials are typically joined to each other by means of a weld defined by the interface solidification of melted portions of the two materials. This disclosure describes, as an optional aspect of the present invention, multi-shot injection molding processes for making fluid receiver fittings 293.

Fluid Receiver Fittings and Adapters—Structure and Use

As an aspect of the present invention, a fluid receiver fitting 293 is provided for facilitating aseptic fluid transmission from a dispensing enclosure to a receiving enclosure. The fitting 293 may be used and may function substantially as discussed above with respect to the fitting 93 described in the '517 patent. However, uniquely, the fluid receiver fitting 293 of the present invention is an improved product by virtue of being made by an improved process, namely multi-shot injection molding, as disclosed herein. As such, these sections 226/228 are not press-fitted together, nor are there any adhesives used to maintain these two members together as these adhesives may comprise solvents that could contaminate the collected fluid sample.

An improved fluid receiver fitting (FRF) for supporting an aseptic fluid transfer between enclosures is disclosed below. By way of example only, the "enclosures" may comprise a liquid stream LS in a first enclosure 216 (see FIGS. 5E-5G or FIGS. 6D and 6F) from which the fluid sample is removed by an aseptic needle/syringe (e.g., a hypodermic needle), i.e., the second enclosure.

Figure 1:
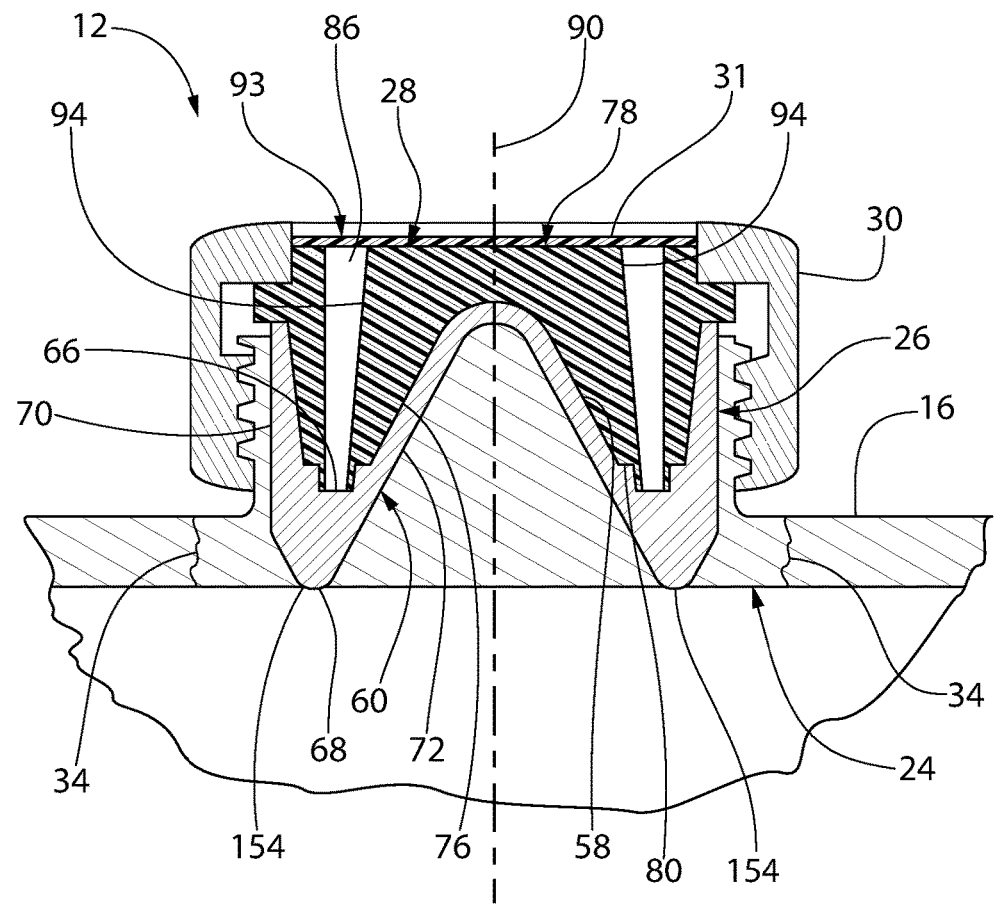
FIG. 1 corresponds to prior art FIG. 11 of the U.S. Pat. No. 4,941,517 (hereinafter, "the '517 patent") and shows a cross-section of the fluid receiver assembly described in the '517 patent.
Figure 2:
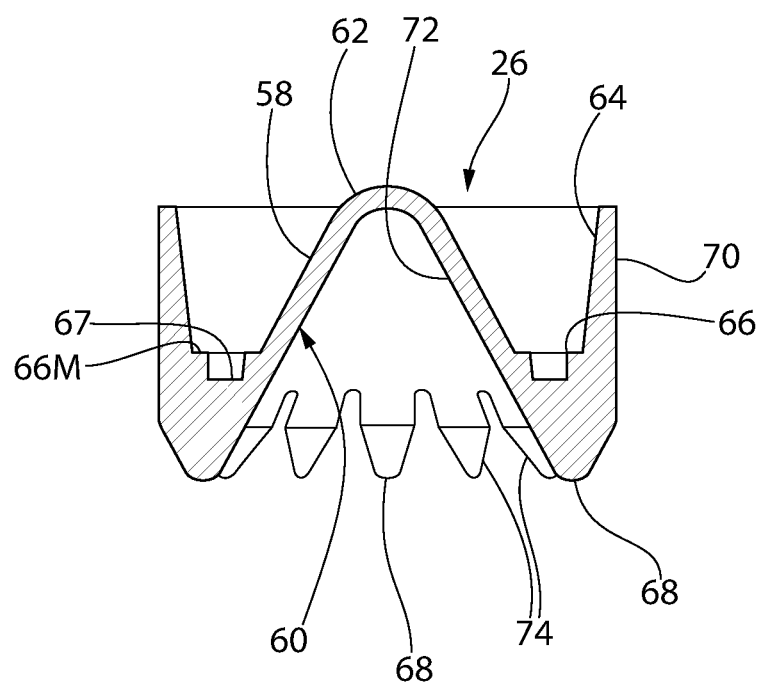
FIG. 2 corresponds to prior art FIG. 6 of the '517 patent and shows a cross-section of a seal member according to the fluid receiver assembly described in the '517 patent.
Figure 3:
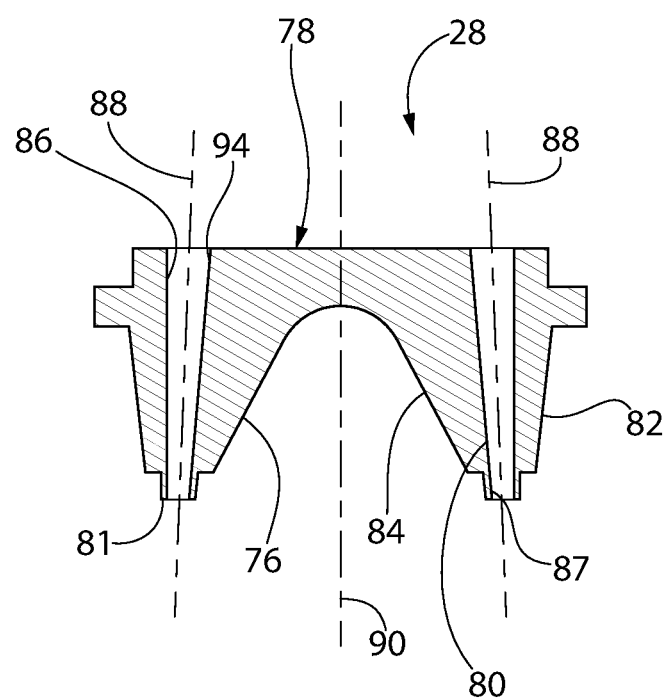
FIG. 3 corresponds to prior art FIG. 8 of the '517 patent and shows a cross-section of a channel member according to the fluid receiver assembly described in the '517 patent.
Figure 4:
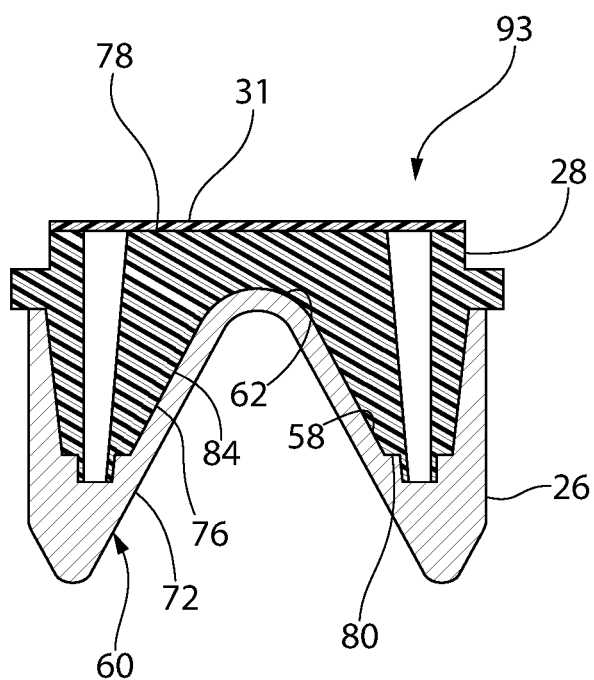
FIG. 4 corresponds to prior art FIG. 10 of the '517 patent and shows a cross-section of fluid receiver fitting according to the fluid receiver assembly described in the '517 patent.
Figure 5D:
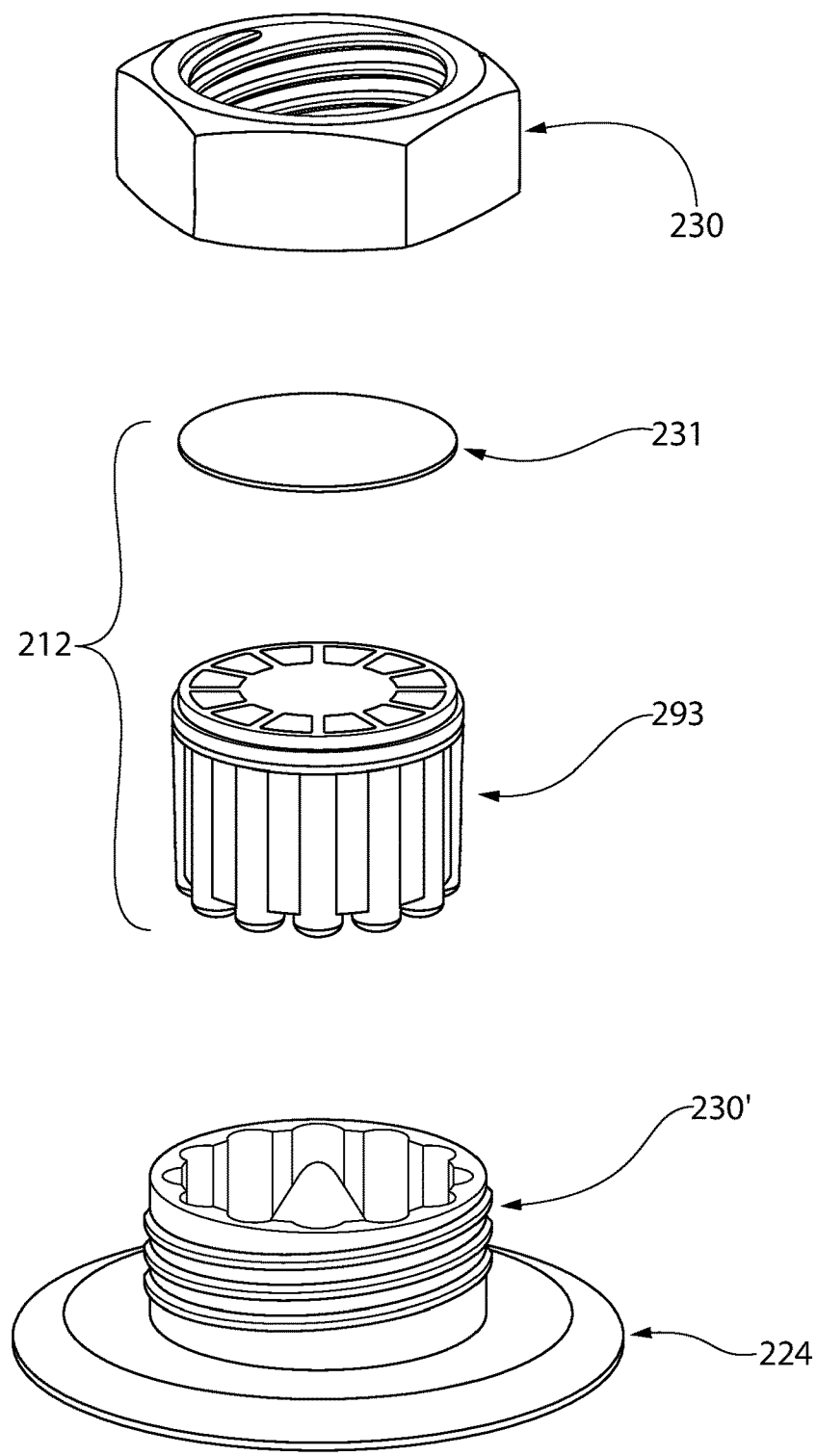
FIG. 5D is an exploded view of a fluid receiver assembly incorporating the twelve-port receiver fitting or septum of FIGS. 5A-5C, with a sealing cover.

Referring to FIGS. 5A-5D, the fluid receiver fitting 293 comprises three primary sections: a channel section 228, a seal section 226 and a sealing cover 231 (FIG. 5D). As will be discussed below, the channel section 228 and the seal section 226 are integrally-formed to establish a unitary element that avoids the problems of the prior art.

The channel section 228 may be made from any of the materials discussed above with respect to the channel member 28 of the fitting 93 of the '517 patent. In an alternate embodiment, the channel section 228 of the present invention is made from polypropylene (PP) or polyamide (nylon). Alternatively, the channel section 228 may be made from polyethylene (PE—high density, low density, LLD, VLLD), polyvinyl chloride (PVC), high impact polystyrene (HIPS), cyclic olefin co-polymer (COC), cyclic olefin polymer (COP), polyethylene vinyl acetate (EVA), polystyrene (PS), polycarbonate (PC), polyester terephthalate (PET), acetal copolymer or homopolymer resin, and/or liquid crystal polymer. Alternatively, the channel section 228 is made from a combination of two or more of the aforementioned polymers.

The seal section 226 may be made from any of the materials discussed above with respect to the seal member 26 of the fitting 93 of the '517 patent. In another alternative embodiment, the seal section 226 of the present invention is made from a thermoplastic elastomer (TPE), such as a styrenic, copolyester, polyurethane, polyamide, polyolefin blend, polyolefin alloy, reactor polyolefin blend, polyolefin plastomer, polyolefin elastomer, or any combination of one or more of the foregoing.

In a process described in greater detail below, the channel section 228 and seal section 226 may be molded together via a 2-shot mold process. Structurally, the outer surface of the channel section 228 bonds to the inner surface of the seal section 226 via the molding process. Openings in the top surface of the channel section 228 lead to needle guide channels or ports 286, which provide needle access to the bottom of the seal section 226 in a penetration zone 266 of the seal section 226. As shown in FIG. 5C, preferably, the seal section 226 protrudes up slightly in a nub 287 (e.g., 1 mm-2 mm) into each channel 286 to prevent cross-contamination or "wicking" between channels 286.

As shown in FIG. 5D, the fluid receiver fitting 293 may be removably secured to an adapter 224 via a retaining ring 230 (e.g., a nut), thus forming a fluid receiving assembly 212. The retaining ring 230 may engage corresponding threads 230' on the outer periphery of the adapter 224. Alternatively, the adapter 224 is a permanent fixture in a wall of an enclosure and the fitting 293 is removable therefrom and may be replaced as needed. When the fluid receiving assembly 212 is installed, each lower end of the seal section 226 is exposed to the fluid (e.g., a liquid stream LS, see FIG. 5D) from which the sample(s) is to be taken.

Figure 5E:
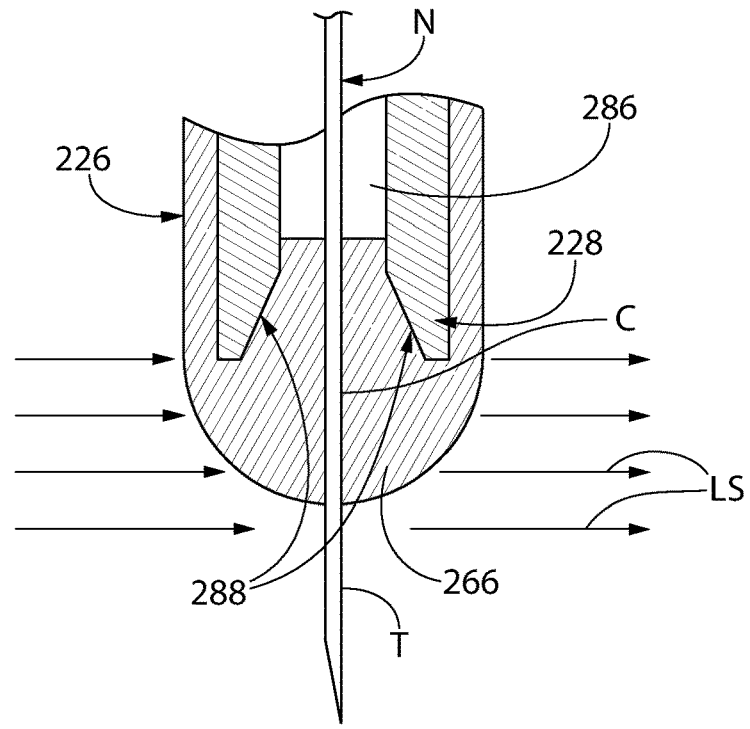
FIG. 5E is a partial functional view of the penetration zone showing a needle penetrating therethrough into a liquid stream.
Figure 5F:
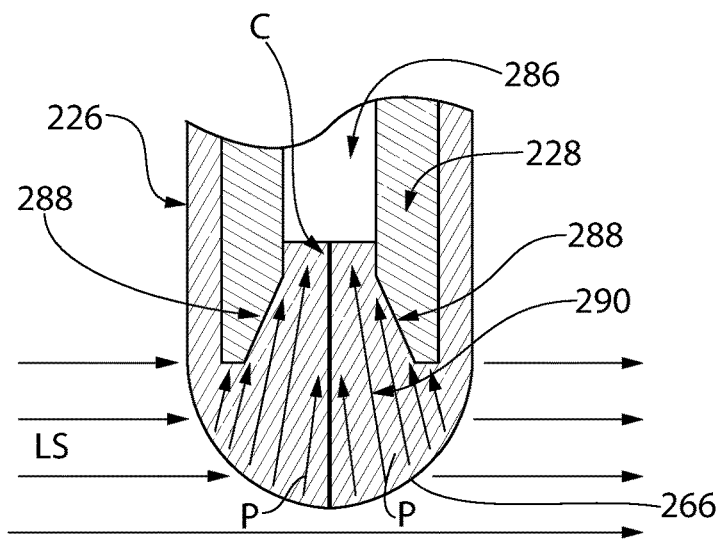
FIG. 5F is similar to FIG. 5E but showing the angled interface between the seal section and the channel section that concentrates liquid stream pressure to close the core left by the needle.
Figure 5G:
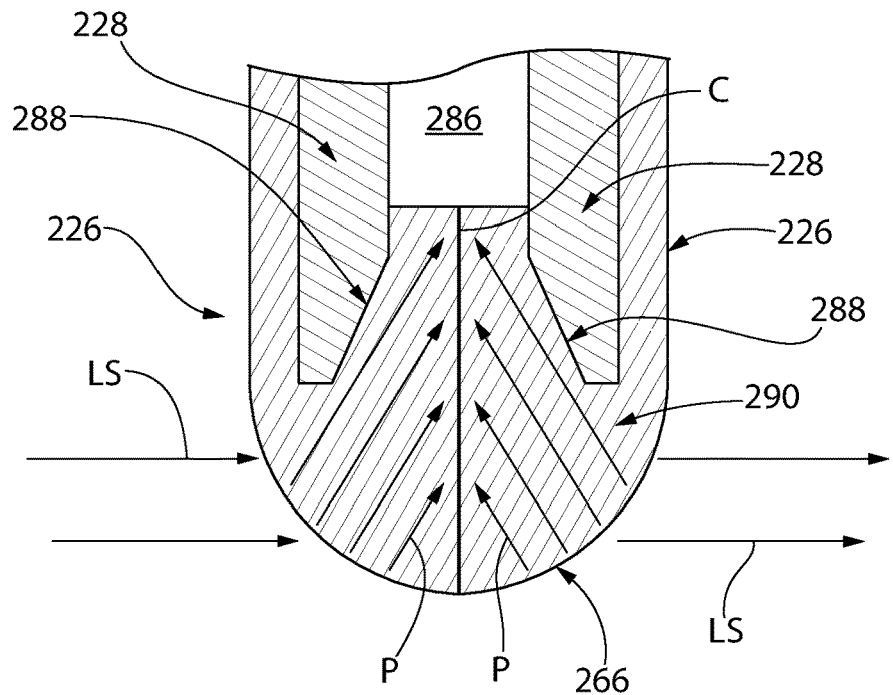
FIG. 5G is similar to FIG. 5F but a little later in time showing the core closed by the concentrated liquid stream pressure.
Figure 5H:
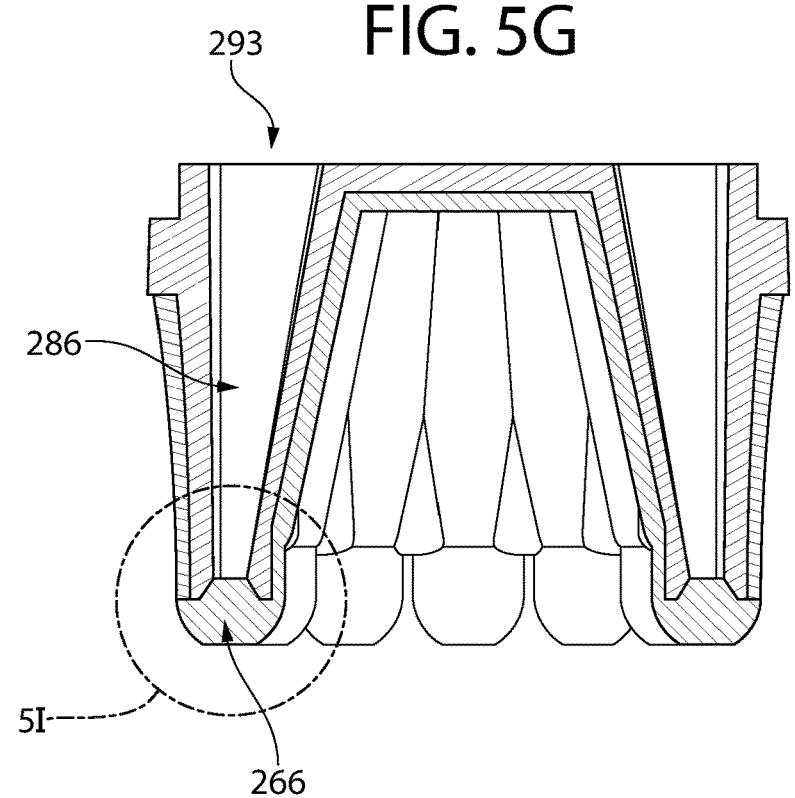
FIG. 5H is a cross-sectional view of the twelve-port receiver fitting including an angled interface between the seal section and the channel section at the penetration zone.

To enhance the closure of the penetration zone 266 once a needle has passed through the penetration zone 266, withdrawn the fluid sample from a liquid stream LS and has been removed from the needle channel 286, a fluid pressure concentration zone is formed at the end of the channel 286. In particular, FIG. 5E is a partial view of a penetration zone 266 depicting a needle passed therethrough, having a needle tip T that is disposed in the liquid stream LS from which the fluid sample is being taken. Once the needle N is pulled out of the liquid stream LS, up through the penetration zone 266 and up into the needle channel 286, a core C is left in the penetration zone 266. As can be seen most clearly in FIG. 5F, the distal end of the channel member 228 is tapered to form an angled interface 288 for directing fluid pressure P applied by the liquid stream LS to the penetration zone 266. Because a portion of each penetration zone 266 is exposed to the liquid stream LS, the liquid stream pressure P is applied against the penetration zone 266 and conveyed towards the distal end of the needle channel 286. The angled interface 288 directs or concentrates this liquid stream pressure P towards the base of the needle channel 286, thereby closing the core C in the direction of the arrows 290, as shown in FIG. 5G. As discussed previously, the seal section 226 may comprise TPE, so as the liquid stream pressure P pushes against the TPE section, the pressure P is directed to force the TPE material together due to the angled interface 288. As mentioned previously, the needle N (e.g., 14-18 G, 3 bevel cannula) penetrates through the penetration zone 266 TPE in order to access the liquid stream LS to retrieve the liquid sample. When the needle N retracts from the TPE, this leaves a hole C that must reseal or leaking will occur. As the needle N retracts, the pressure of the liquid stream LS pushes against the TPE. The angled interface 288 of the nylon material of the channel section 228 at the distal end of each channel 286 is designed to make the TPE push "together", thus allowing for better re-sealing of the TPE material in the seal section 226. In contrast, if no interface were present, as the needle N would retract, the pressure of the liquid stream LS would cause the TPE to want to push "away" from the needle hole C, thus causing a potential leak to occur.

The taper angle, θ, of the angled interface 288 should be approximately 30°-120°, with the preferred angle θ being in the range of 60°-120°. The taper angle θ is configured to enable the core C to collapse in on itself to create a seal upon removal of the needle N from the penetration zone 266. This is particularly important for a material like a TPE, which will not naturally collapse in on itself without this taper.

As mentioned previously, the seal section 226 and channel section 228 may be formed by a 2-shot process that allows the TPE material of the seal section 226 to thermally bond to the nylon material of the channel section 228. This bonding occurs around the outside of each twelve-port hole, as well as down the angled interface 288 and then into the port 286 to form the nub 287 (e.g., for 1.5 mm). Thus, another advantage of the thermally-bonded design of the seal portion 226/channel portion 228 is that this design facilitates the angled interface 288 in guiding the liquid sample pressure P to be exerted on the TPE to reseal the hole/core C. In contrast, using the two piece prior art seal member 26/channel member 28 design that poses more of a bulge convex shape as it is pushed against each port needle hole/core C; as a result, any needle puncture would most likely cause more of a separation resulting in potential leakage.

Figure 6C:
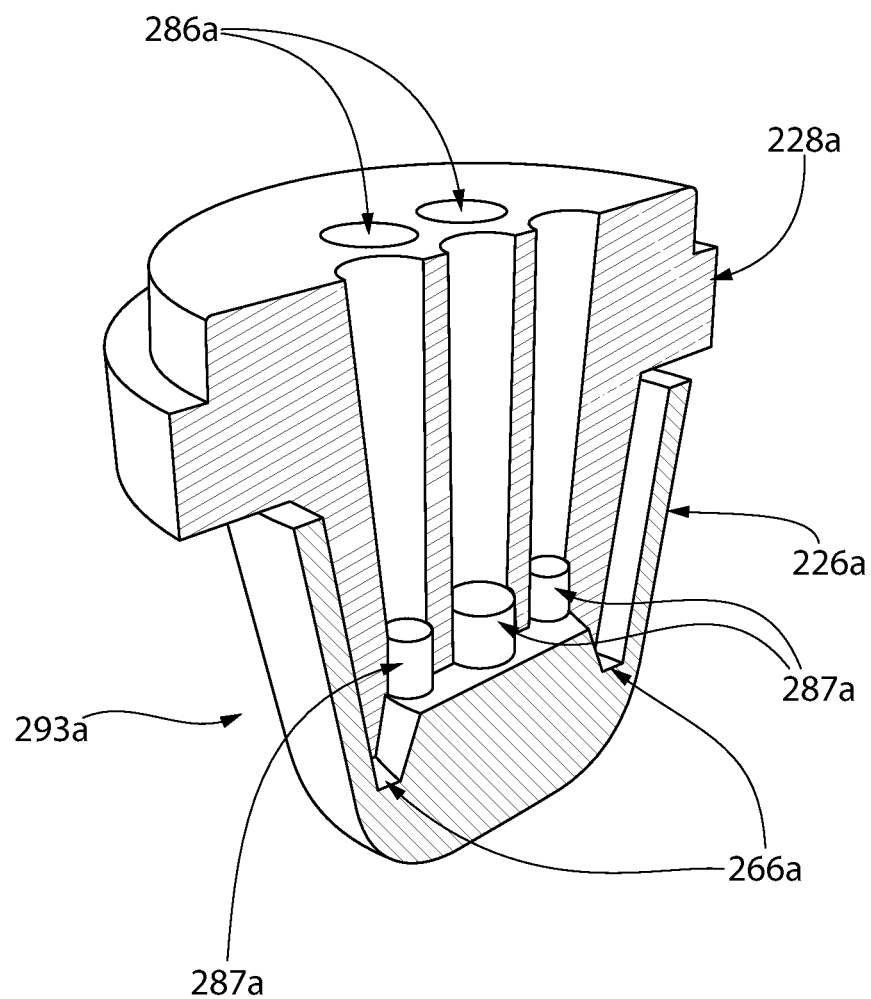
FIG. 6C is an enlarged cross-sectional view of the seven-port fluid receiver fitting or septum, without a sealing cover, taken along line 6C-6C of FIG. 6A.
Figure 6D:
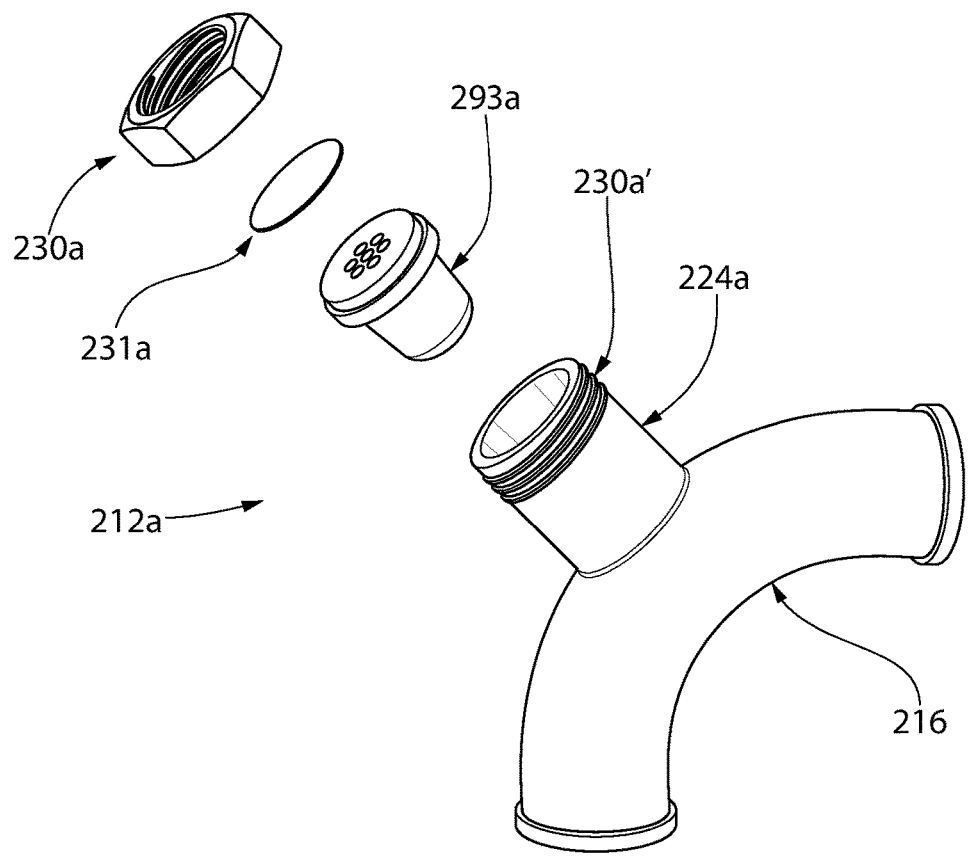
FIG. 6D is an exploded view of a fluid receiver assembly incorporating a seven-port receiver fitting or septum of FIGS. 6A-6C, with a sealing cover, in accordance with an alternative embodiment of the present invention.
Figure 6E:
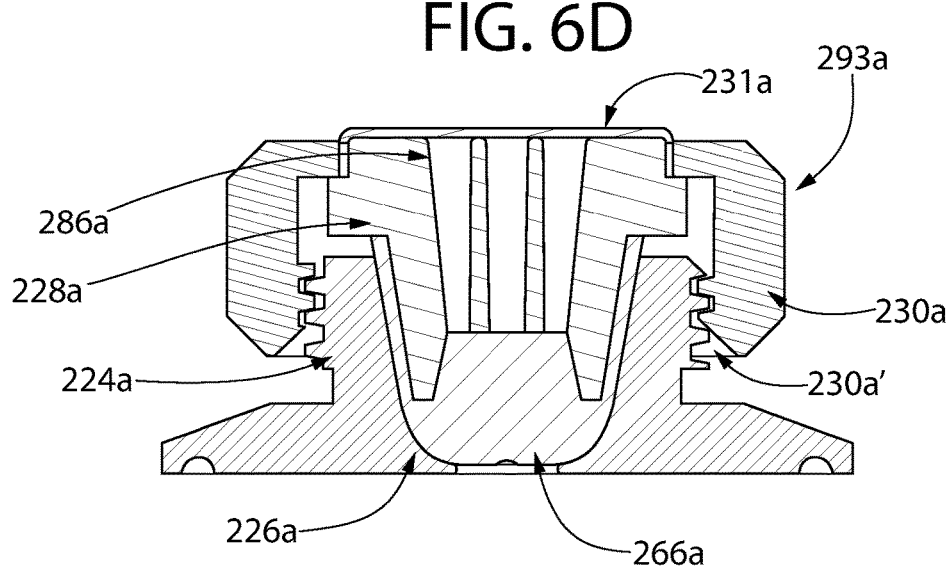
FIG. 6E is a cross section view of the fluid receiver assembly incorporating a seven-port receiver fitting or septum taken along a sight line similar to line 6C-6C in FIG. 6A, and fully assembled using an adapter similar to the one shown in FIG. 5D for the twelve-port receiver fitting or septum.
Figure 6F:
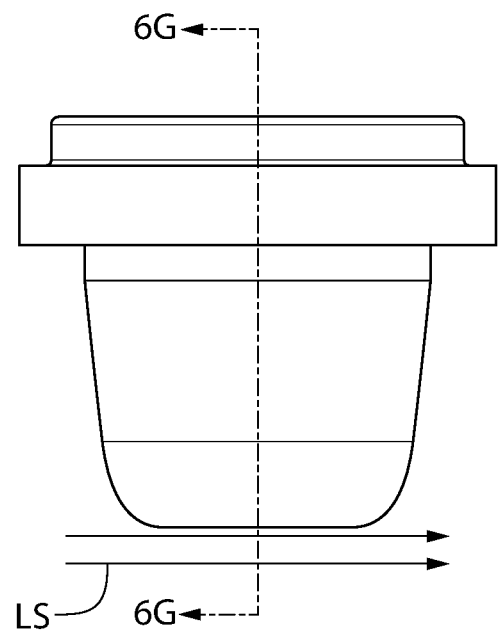
FIG. 6F is plan view of the seven-port fluid receiver.
Figure 6G:
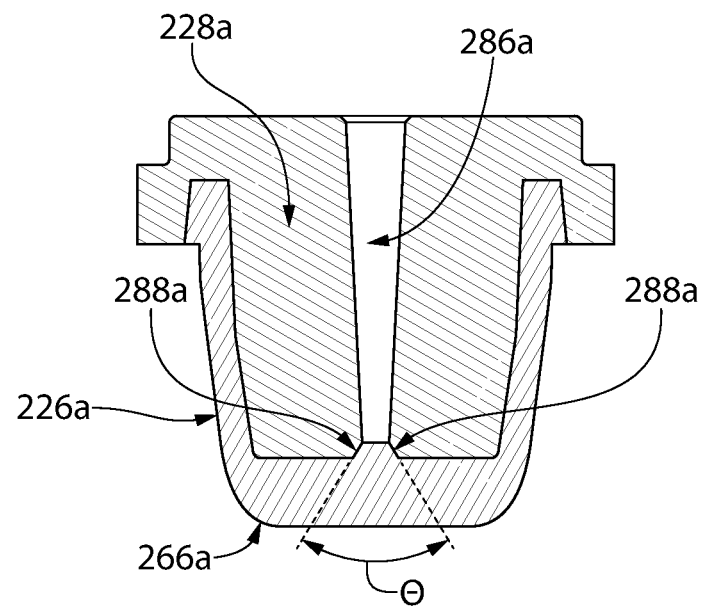
FIG. 6G is a cross-sectional view of the seven-port fluid receiver taken along line 6G-6G showing the angled interface between the seal section and the channel section at the penetration zone.

As mentioned previously, in the embodiment shown in FIGS. 5A-5D, the channel section 228 includes twelve needle channels 286, also referred to hereinafter as "ports". These ports 286 are concentrically arranged about the central axis of the channel section 228. However, it should be understood that a channel section according to the present invention may include as few as one port or a plurality of ports. For example, FIGS. 6A-6D depict an alternative fluid receiver fitting 293a having seven ports 286a, by way of example only. In this configuration, the fluid receiver fitting 293a forms a fluid receiving assembly 212a comprised of the seal section 226a, channel section 228a, cover 231a and retaining ring 230a (e.g., a nut) the latter of which engages corresponding threads 230a' on the upper portion of an adapter 224a that is permanently attached to a wall (e.g., a conduit or piping 216) of an enclosure that houses/conveys the liquid to be sampled. The fluid receiver fitting 293 is thus releasably secured to the wall 216 via the retaining ring 230a. FIG. 6E is a cross-sectional view of the 7-port fluid receiver fitting 293a but attached to an adapter similar to adapter 224 shown in FIG. 5D.

The sealing cover 231/231a of the fluid receiver fitting 293/293a are preferably made from a polypropylene substrate or any poly materials that would thermally bond. Alternatively, the sealing cover 231/231a is a heat sealed post molded label applied to the top surface of the channel member 228/228a, e.g., by robot. Alternatively, the sealing cover 231/231a is molded to the top surface of the channel member in a 3-shot molding process (wherein each component of the receiver fitting 293/293a, i.e., 226/226a, 228/ 228a and 231/231a, is injection molded in a separate step or shot and thus molded together as a single, unitary structure).

To use the fluid receiver assemblies 212/212a, a user may penetrate the sealing cover 231, 231a using a needle or other sharp cannulated member, enabling the needle to enter a single channel 286, 286a of the channel section 228, 228a. The needle then punctures the penetration zone 266, 266a of the sealing member 226, 226a, e.g., to draw a fluid sample from fluid flowing through or being held by an enclosure. Alternatively, the needle deposits a fluid sample into the enclosure. In either case, the needle may, in this manner, facilitate the aseptic transfer of fluid from a dispensing enclosure to a receiving enclosure.

Thus, it should be understood that the number of ports (i.e., needle channels) does not limit the present invention. By way of example only, the fluid receiver fitting 293/293a and corresponding fluid receiver assembly 212/212a may comprise a single port or a plurality of ports.

Molding Processes

In one aspect of the present invention, a multi-shot injection molding process is provided for molding a fluid receiver fitting 293, 293a. A first mold cavity makes the channel section 228 and a second mold cavity forms the seal section 226. Optionally, a third mold cavity forms the sealing cover, if a 3-shot injection molding process is to be used.

The following is an optional process for manufacturing the fluid receiver fitting according to an aspect of the present invention. Alternative (or additional or fewer) process steps and materials may be used within the spirit and scope of the present invention.

According to an optional 2-shot molding process, a fluid receiver fitting 293, 293a may be manufactured by the following steps:
(1) A first shot of material (e.g., PP or nylon) is injected into a cavity to form the channel section 228 of the septum or fluid receiver fitting;
(2) Optionally, the mold shuttles or rotates;
(3) A second shot of material (e.g., TPE) is injected into the cavity to form a sealing section 226 below the channel section 228, thus forming an assembled part;
(4) Optionally, the assembled part is ejected once the assembled part is sufficiently cooled and set;
(5) Optionally, a robot moves the assembled part out of the mold;
(6) Optionally, the robot end of the arm tooling applies the PP or compatible poly label to the top of the body, wherein the label (i.e., the sealing cover) is adhered via heat sealing thus forming the top sealing cover that completely seals the ports 286.

Although the molding method described herein is particularly suitable for two-shot or multi-shot injection molding processes, the method can also be used in overmold processes. Using an overmold process, a previously molded part is inserted into a mold and a second material is overmolded about the molded part.

Optional Advantages of the Invention

A fluid receiver fitting 293, 293a made according to multi-shot molding processes described herein provides significant practical advantages over the prior art. One such advantage is simplicity of the manufacturing process (once the molds are made), which facilitates more cost effective and efficient manufacturing, particularly where high-cavitation molding equipment is used. The process according to the present invention allows the entire fluid receiver fitting 293, 293a to be molded as a one-piece assembly, as opposed to the three piece assembly (by hand or automated) described in the '517 patent. The three piece assembly of the prior art requires attention to tight manufacturing tolerances to ensure a tight fit between the seal member and channel member. This can add expense to the manufacture of the product, yet still does not provide the structural integrity that a fitting 293, 293a according to the present invention provides. The present invention provides a more robust construction and thus carries a much lower risk of failure, compared to the fitting of the '517 patent. For example, there is a risk that applying too much torque to the retaining ring when securing the fitting to the adapter can damage the fitting or compromise its function. Yet if not enough torque is applied, there is a risk that the two independent portions of the septum/fitting (i.e., the channel member and seal member) could separate, possibly allowing fluid to cross-contaminate or "wick" between the ports.

Another advantage of the present invention is that it obviates the need for adhesive materials between the components of the assembly. For example, the '517 patent states that adhesive should be used to bond the channel member and seal member to one another. The '517 patent also provides that the covering film should be applied to the channel member via adhesive. However, adhesives tend to carry residual solvents, which may compromise (i.e., contaminate) the fluid samples are supposedly to be transferred in an aseptic manner. Fluid receiver fittings 293, 293a of the present invention uniquely require no adhesive in their assembly. This further overcomes other problems associated with applying a pressure sensitive adhesive label to the channel member, such as the risk of non-uniform adhesive and uneven application due to imperfections in the top surface of the channel member or due to tool wear over time.

While the invention has been described in detail and with reference to specific examples thereof, it will be apparent to one skilled in the art that various changes and modifications can be made therein without departing from the spirit and scope thereof.

What is claimed is:

1. A fluid receiver fitting for supporting the aseptic transfer of a fluid, said fluid receiver fitting comprising:
   a seal section formed by injection molding a first material adapted to be pierceable by conventional hypodermic needles once said first material is set;
   a channel section formed by injection molding a second material that is adapted to not be pierceable by conventional hypodermic needles once said second material is set, said channel section comprising one or more channels therein, each of said channels comprising a first end that provides ingress into a respective channel and a second end that forms an interface with a portion of said seal section, said seal section and said channel section being molded into a unitary element such that said seal section surrounds said channel section except at said first ends of said channels, said interfaces between each second end and a respective portion of said seal section forming respective penetration zones to permit the passage of a hypodermic needle therethrough when the needle is passed through said respective channel to gain aseptic access to the fluid to be transferred when a portion of said seal section, adjacent said penetration zones, is exposed to said fluid, wherein each of said interfaces comprises a nub of said first material that protrudes up into each of said channels to prevent cross-contamination or wicking between channels.

2. The fluid receiver fitting of claim 1 wherein said seal section and said channel section are molded into a unitary element by a weld defined by the solidification of melted portions of said first material and said second material.

3. The fluid receiver fitting of claim 2 wherein said first material comprises thermoplastic elastomer (TPE).

4. The fluid receiver fitting of claim 1 wherein said second material comprises one or more injection-moldable polymers selected from the group consisting of: nylon, polypropylene (PP), polyethylene (PE high density, low density, LLD or VLLD), polyvinyl chloride (PVC), high impact polystyrene (HIPS), cyclic olefin co-polymer (COC), cyclic olefin polymer (COP), polyethylene vinyl acetate (EVA), polystyrene (PS), polycarbonate (PC), polyester terephthalate (PET), acetal copolymer or homopolymer resin, and liquid crystal polymer.

5. The fluid receiver fitting of claim 1 further comprising a sealing cover applied over said first ends of said channels without the use of a bonding adhesive or fastener(s).

6. The fluid receiver fitting of claim 5 wherein said sealing cover comprises a polypropylene substrate or other poly material adapted to thermally bond.

7. The fluid receiver fitting of claim 1 wherein the fluid is a liquid stream and wherein each of said second ends comprises a tapered structure for concentrating pressure from the liquid stream from said penetration zone inward towards the respective channel for closing a core formed in said penetration zone by the hypodermic needle following its removal therefrom.

8. The fluid receiver fitting of claim 7 wherein said taper comprises an angle $\theta$ wherein $30° \leq \theta \leq 120°$.

9. A fluid receiver fitting for supporting the aseptic transfer of a fluid, said fluid receiver fitting comprising:
   a seal section formed by injection molding a first material adapted to be pierceable by conventional hypodermic needles once said first material is set;
   a channel section formed by injection molding a second material that is adapted to not be pierceable by conventional hypodermic needles once said second material is set, said channel section comprising one or more channels therein, each of said channels comprising a first end that provides ingress into a respective channel and a second end that forms an interface with a portion of said seal section, said seal section and said channel section being molded into a unitary element such that said seal section surrounds said channel section except at said first ends of said channels, said interfaces between each second end and a respective portion of said seal section forming respective penetration zones to permit the passage of a hypodermic needle therethrough when the needle is passed through said respective channel to gain aseptic access to the fluid to be transferred when a portion of said seal section, adjacent said penetration zones, is exposed to said fluid, wherein the fluid is a liquid stream and wherein each of said second ends comprises a tapered structure for concentrating pressure from the liquid stream from said penetration zone inward towards the respective channel for closing a core formed in said penetration zone by the hypodermic needle following its removal therefrom,
   wherein said taper comprises an angle $\theta$, wherein $30° \leq \theta \leq 120°$.

10. The fluid receiver fitting of claim 9 wherein said seal section and said channel section are molded into a unitary element by a weld defined by the solidification of melted portions of said first material and said second material.

11. The fluid receiver fitting of claim 10 wherein said first material comprises thermoplastic elastomer (TPE).

12. The fluid receiver fitting of claim 9 wherein said second material comprises one or more injection-moldable polymers selected from the group consisting of: nylon, polypropylene (PP), polyethylene (PE high density, low density, LLD or VLLD), polyvinyl chloride (PVC), high impact polystyrene (HIPS), cyclic olefin co-polymer (COC), cyclic olefin polymer (COP), polyethylene vinyl acetate (EVA), polystyrene (PS), polycarbonate (PC), polyester terephthalate (PET), acetal copolymer or homopolymer resin, and liquid crystal polymer.

13. The fluid receiver fitting of claim 9 further comprising a sealing cover applied over said first ends of said channels without the use of a bonding adhesive or fastener.

14. The fluid receiver fitting of claim 13 wherein said sealing cover comprises a polypropylene substrate or other poly material adapted to thermally bond.

15. The fluid receiver fitting of claim 9 wherein each of said interfaces comprises a nub of said first material that protrudes up into each of said channels to prevent cross-contamination or wicking between channels.

16. A fluid receiver fitting comprising:
a seal section adapted to be pierceable by a needle; and
a channel section adapted to not be pierceable by a needle, the channel section comprising one or more channels therein, each of the channels comprising a first end that provides ingress into a respective channel and an opposing second end that forms an interface with a portion of said seal section, the seal section surrounding at least a portion of the channel section, the second end of each channel including a tapered section extended at an angle different from an angle of the first end of each channel, the interface between the second end of each channel and a respective portion of the seal section forming a penetration zone to permit the passage of a needle therethrough when the needle is passed through said respective channel to gain aseptic access to a fluid to be transferred when a portion of the seal section, adjacent each penetration zone, is exposed to said fluid.

17. The fluid receiver fitting of claim 16, wherein at least a portion of the seal section is located within the second end of each channel.

18. The fluid receiver fitting of claim 17 wherein the seal section and the channel section are molded into a unitary element by a weld defined by solidification of melted portions of a first material and a second material.

19. The fluid receiver fitting of claim 16, wherein the seal section is formed by injection molding a first material adapted to be pierceable by conventional hypodermic needles once the first material is set.

20. The fluid receiver fitting of claim 16, wherein the channel section is formed by injection molding a second material that is adapted to not be pierceable by conventional hypodermic needles once the second material is set.

21. The fluid receiver fitting of claim 19 wherein the seal section comprises thermoplastic elastomer (TPE).

22. A fluid receiver fitting comprising:
a seal section adapted to be pierceable by a needle; and
a channel section adapted to not be pierceable by a needle, the channel section comprising one or more channels therein, each of the channels comprising a first end that provides ingress into a respective channel and an opposing second end that forms an interface with a portion of said seal section, the seal section surrounding at least a portion of the channel section, at least a portion of the seal section being located within the second end of each channel, the interface between the second end of each channel and a respective portion of the seal section forming a penetration zone to permit the passage of a needle therethrough when the needle is passed through said respective channel to gain aseptic access to a fluid to be transferred when a portion of the seal section, adjacent each penetration zone, is exposed to said fluid.

23. The fluid receiver fitting of claim 22, wherein the second end of each channel includes a tapered section extending at an angle different from an angle of the first end of each channel.

24. The fluid receiver fitting of claim 23 wherein the seal section and the channel section are molded into a unitary element by a weld defined by solidification of melted portions of a first material and a second material.

25. The fluid receiver fitting of claim 22, wherein the seal section is formed by injection molding a first material adapted to be pierceable by conventional hypodermic needles once the first material is set.

26. The fluid receiver fitting of claim 25 wherein the seal section comprises thermoplastic elastomer (TPE).

27. The fluid receiver fitting of claim 22, wherein the channel section is formed by injection molding a second material that is adapted to not be pierceable by conventional hypodermic needles once the second material is set.

* * * * *